A. P. BROWN.
Globe-Valves.
No. 140,006.                    Patented June 17, 1873.
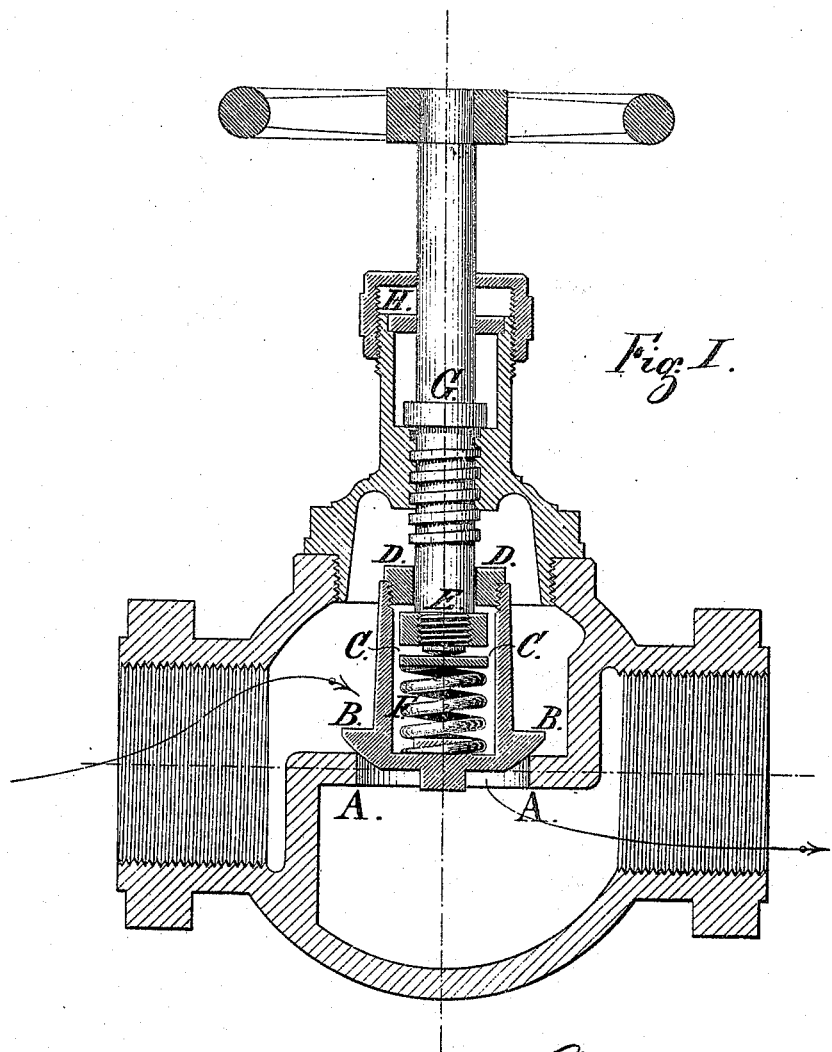
Fig. I.
Augustus P. Brown
Inventor.
Witnesses.

UNITED STATES PATENT OFFICE.

AUGUSTUS P. BROWN, NEW YORK, N. Y.

IMPROVEMENT IN GLOBE-VALVES.

Specification forming part of Letters Patent No. 140,006, dated June 17, 1873; application filed July 25, 1872.

*To all whom it may concern:*

Be it known that I, AUGUSTUS P. BROWN, of the city, county and State of New York, have invented certain Improvements in Globe-Valves, of which the following is a specification:

This invention consists in constructing the parts of a globe-valve as hereinafter specified, and mounting the valve loosely on the stem, and providing the stem with a stop and the valve with a spring in such manner that the valve cannot be forced rigidly upon its seat by any force that may be applied to the stem, but will be guided and controlled thereby to such a degree as to make it practically very efficient; and the object of the invention is to prevent the now common injury resulting to such valves from unequal expansion, as often occurs when the valve has been closed very firmly when cold, and then become suddenly heated, by which the stem or thread is jammed or the seat or face of the valve injured.

The drawing represents a valve and its chamber in vertical and longitudinal section through its inlet and outlet parts, but with the stem and spring complete.

The seat of the valve is represented at A, in a chamber similar to the ordinary globe-valves, but instead of being chamfered on the face to correspond to the globular part of the valve, it is brought to a sharp edge or angle, as shown in the drawing. The valve B is spherical on its face, or that portion of it which closes upon the seat, but upon one side of the section or segment of the sphere, a cylinder is formed to furnish sufficient space for a spring, as shown at C, between the inner end of the stem and the valve proper. This cylindrical part of the valve also extends up above the spring sufficiently far to receive a guide that surrounds the stem as at D. The stem extends through said guide into the interior of the valve or its cylinder far enough to receive a nut, as at E, on the end of the stem and within the cylindrical portion of the valve and below the guide D, and by which the valve is lifted from its seat when opened. Between the end of the stem and the bottom of the cylinder, a spring, as at F, is inserted, of sufficient length to fill the space between the inner end of the stem and the valve, or nearly so, and upon the stem end of said spring, a washer is placed to receive the thrust of the stem in the operation of closing the valve. If no pressure is exerted upon the back of the valve by the liquid or steam in the inlet end of the pipe, then the spring acts to close the valve, when the stem is thrust inward by the screw, and it is the only agent that imparts the pressure of the stem to the valve; consequently the power of the stem in forcing the valve upon its seat is limited to the force of the spring, and this only to a partial extent, for at G, upon the stem is a stop or fixed collar that moves with the stem in a chamber between the stuffing-box and the valve; and when the stem is screwed inward against the valve, or the spring to close the valve, then said collar or stop strikes against the bottom of said chamber and checks the inward movement of the stem and thereby effectually prevents the jamming of the valve upon its seat or upon any substance that may be lodged thereon; such a construction also permits the valve to expand and slide on the stem without injuring any of the parts. At H, a stuffing-box or packing-chamber is provided similar to the valves now in use.

I therefore claim—

1. In a globe-valve, constructed as herein shown and described, the valve B, provided with the chamber C, and with the reacting-spring F, in combination with the guide D, the valve-stem G, and its fastening-nut E, substantially as herein shown and described.

2. The valve B, having the spherical bearing-face, and the chamber C, spring F, and guide D', in combination with the valve-stem, the fastening D, shoulder G, and shell A, all constructed and arranged, substantially as herein described.

AUGUSTUS P. BROWN.

Witnesses:
G. CHRIST. MILLER,
A. H. NORRIS.